(12) United States Patent
Qiu et al.

(10) Patent No.: US 7,764,793 B2
(45) Date of Patent: Jul. 27, 2010

(54) METHOD TO LEVERAGE A SECURE DEVICE TO GRANT TRUST AND IDENTITY TO A SECOND DEVICE

(75) Inventors: Xin Qiu, San Diego, CA (US); Bridget D. Kimball, Encinitas, CA (US); Eric J. Sprunk, Carlsbad, CA (US); Lawrence W. Tang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1224 days.

(21) Appl. No.: 11/255,113

(22) Filed: Oct. 20, 2005

(65) Prior Publication Data

US 2007/0091345 A1 Apr. 26, 2007

(51) Int. Cl.
*H04L 29/06* (2006.01)
*H04K 1/00* (2006.01)
*H04N 7/16* (2006.01)
*H04N 7/167* (2006.01)

(52) U.S. Cl. .................. 380/255; 713/155; 725/25
(58) Field of Classification Search .......... 713/155; 380/255; 725/25
See application file for complete search history.

(56) References Cited

U.S. PATENT DOCUMENTS 6,212,279 B1 * 4/2001 Reiter et al. ............... 380/278
6,694,025 B1 * 2/2004 Epstein et al. ............. 380/279

OTHER PUBLICATIONS

Menezes et al. "Handbook of Applied Cryptography", 1997, CRC Press LLC, pp. 400-402, and 554.*

* cited by examiner

*Primary Examiner*—Matthew T Henning
(74) *Attorney, Agent, or Firm*—Larry T. Cullen

(57) ABSTRACT

According to one embodiment of the invention a system is utilized to leverage the security arrangement between a first and second device to establish a secure link between the first device and a third device. One embodiment of the invention is particularly suitable for loading security data on a set top box, such as that utilized in the cable television industry.

15 Claims, 10 Drawing Sheets

METHOD TO LEVERAGE A SECURE DEVICE TO GRANT TRUST AND IDENTITY TO A SECOND DEVICE

Embodiments of this invention relate generally to cryptography. One specific embodiment of the invention relates to loading key data to a device used in a cable television system.

BACKGROUND

In a cable television system, a set-top box is customarily used at the consumer's television to receive incoming television signals from the distribution point, such as the cable head end. The incoming stream of data content is managed typically through the use of cryptographic protocols that utilize key data stored at the distribution point and at the set top box. The use of these cryptographic protocols helps to ensure that unauthorized individuals will not access the program content. However, such unauthorized individuals will often attempt to defeat these security measures. One such attempt is to try and obtain a set top box that has already been loaded with the cryptographic key data and clone that device. A cloned set top box could be very damaging to a cable operator in that it could potentially be duplicated many times over and thus allow pirating of the cable operator's programming.

Thus, cable operators are very careful about loading set top boxes with security data. The initial data that is loaded into a unit is very important to keep secure, as it lays the foundation for all future security measures implemented by the set top box.

One of the steps implemented as part of the initialization process for a set top box is to load a unit address. This unit address allows the cable operator to identify any particular device in its system. The unit address is normally assigned via the use of a certificate downloaded to a set top box.

The use of application specific integrated circuits (ASIC's) are useful in providing security measures for devices involved in secure operations. Such devices can be configured with initial security parameters that are not detectable by reverse engineering. As a result, they can be programmed at the factory with initial security settings and then loaded with additional security data. After being loaded with the additional security data, they can be physically altered to prevent unauthorized access to their data.

Such ASIC's sometimes must work with other parts of a device, such as firmware in a set top box, in order to implement secure operations. However, since such firmware does not have built in security protections, as is the case with the ASIC itself, it is difficult to initiate the firmware with initial security data.

SUMMARY

According to one embodiment of the invention, a method of distributing security data can be implemented in a system comprising a first trusted device, a second security device having a pre-established security relationship with the trusted device, and a third device having a secure relationship with the second device and requiring data from the trusted device in order to establish a secure relationship with the trusted device, wherein the method comprises configuring the first device and the second device so as to allow secure communications between the first device and the second device via a network; configuring the second device and the third device so as to allow secure communications between the second device and the third device; encrypting a first key at the first device as an encrypted first key; encrypting a message at the first device as an encrypted message; sending the encrypted first key from the first device to the second device; sending the encrypted message from the first device to the second device; decrypting the encrypted first key at the second device to obtain the first key; sending the encrypted message to the third device from the second device; sending the first key to the third device from the second device; decrypting the encrypted message at the third device with the first key to obtain the message; and sending the message to the first device from the third device so as to demonstrate to the first device that the third device has the first key.

According to another embodiment of the invention, a method of distributing security data can be implemented in a system comprising a first trusted device, a second security device having a pre-established security relationship with the trusted device, and a third device having a secure relationship with the second device and requiring data from the trusted device in order to establish a secure relationship with the trusted device, wherein the method comprises configuring a first device so as to allow secure communications between the first device and a second device via a network, wherein the second device is configured so as to allow secure communications between the second device and a third device; encrypting a first key at the first device as an encrypted first key; encrypting a message at the first device as an encrypted message; sending the encrypted first key from the first device to the second device; sending the encrypted message from the first device to the second device, wherein the second device is configured to decrypt the encrypted first key at the second device to obtain the first key and wherein the second device is configured to send the encrypted message to the third device from the second device and wherein the second device is also configured to send the first key to the third device from the second device; decrypting the encrypted message at the third device with the first key to obtain the message; and receiving at the first device from the third device the message that was decrypted from the encrypted message at the third device using so as to demonstrate to the first device that the third device has the first key.

Further embodiments of the invention will be apparent from the disclosure and drawings herein.

DETAILED DESCRIPTION

Figure 1:
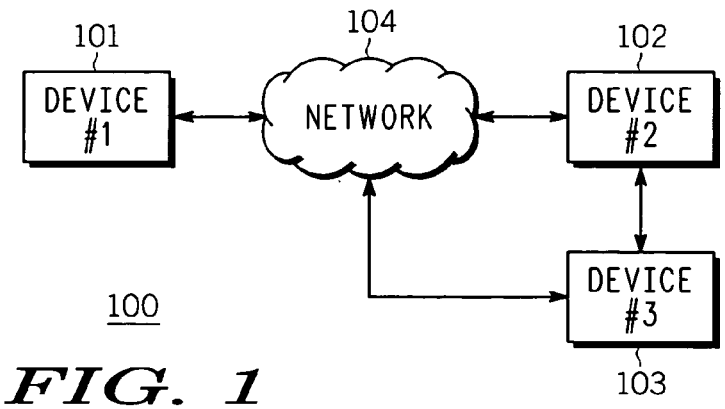
FIG. 1 illustrates a system for implementing an exchange of secure information between a first device, a second device, and a third device, according to one embodiment of the invention.

Referring now to FIG. 1, a system 100 for implementing a security protocol between three devices can be seen . In system 100, a first device 101 is shown. This device is understood to possess security information needed by the other devices shown in the system. For example, this security information might entail a key or keys to be used by the other devices in cryptographic communications. Another example, is that the security information might entail digital identity information or a digital certificate for storage at one or both devices. FIG. 1 shows a second device 102 that is coupled with the first device across a network 104. This second device can be a computer or chip that forms part of a computer. The network 104 can be an open network that allows communications according to a publicly available protocol—such as the internet. Alternatively, the network can be a closed network in which knowledge of the communication protocols between the devices is intended to be known only to predetermined individuals. Further, the coupling between the first device and second device can be implemented via a direct connection. FIG. 1 also shows a third device 103 that is coupled both with the second device and the network 104. Again, the third device can be a computer or a chip that forms part of a computer. For example, device 103 could be implemented as firmware that is used as part of a computing device. It could even be firmware that is part of an ASIC that makes up device 102.

According to one embodiment of the invention, FIG. 1 illustrates a system in which first device 102 is a server that stores personalization and security data needed by device 102 and device 103. Second device 102 is configured during its manufacture or under extremely secure conditions to store information that allows it to have pre-configured security arrangements with first device 101. For example, device 102 can be configured as an ASIC with a particular security protocol for communications with device 101. As an example, device 102 and device 101 can be pre-configured with the Elliptical Curve Diffie Hellman protocol for implementing secure communications between the first device 101 and the second device 102. Alternative cryptographic protocols could be used, as well, such as the Integral Diffie Hellman protocol. Such protocols are well understood by those of ordinary skill in the art and are illustrated for example in the books *Applied Cryptography,* second edition, by Bruce Schneier, John Wiley and Sons 1996 and *Handbook of Applied Cryptography*, by Menezes et al., CRC Press LLC 1997.

According to this embodiment, while the first device and the second device are pre-configured for secure communication, the second device has not yet been authenticated to the first device. Furthermore, the second device has not been assigned data that allows it to be identified with a particular id number. For example, while set top boxes can be mass produced to be able to communicate securely with a server. They are not assigned unit identifiers as part of their manufacture. Rather, at a later date, they are coupled with a database across a secure communication link and issued an id. Thus, they are manufactured with pre-configured security protocols that allow that secure communication link to be established when required.

In addition, the third device under this example, can be envisioned to be a less secure device that operates in conjunction with the second device. For example, if the second device is an ASIC that forms part of a set top box, the third device could be firmware in the set top box that operates in conjunction with the ASIC. Such firmware may be involved in security operations and thus need certain security or personalization data from the first device. However, since the third device is not pre-configured with a security protocol that allows secure communications with the first device, a different security technique must be implemented to establish secure communications with the first device. As will be explained, this can be accomplished under this system by leveraging the pre-configured security arrangement between the first and second devices and the secure link between the second and third devices.

Figure 2:
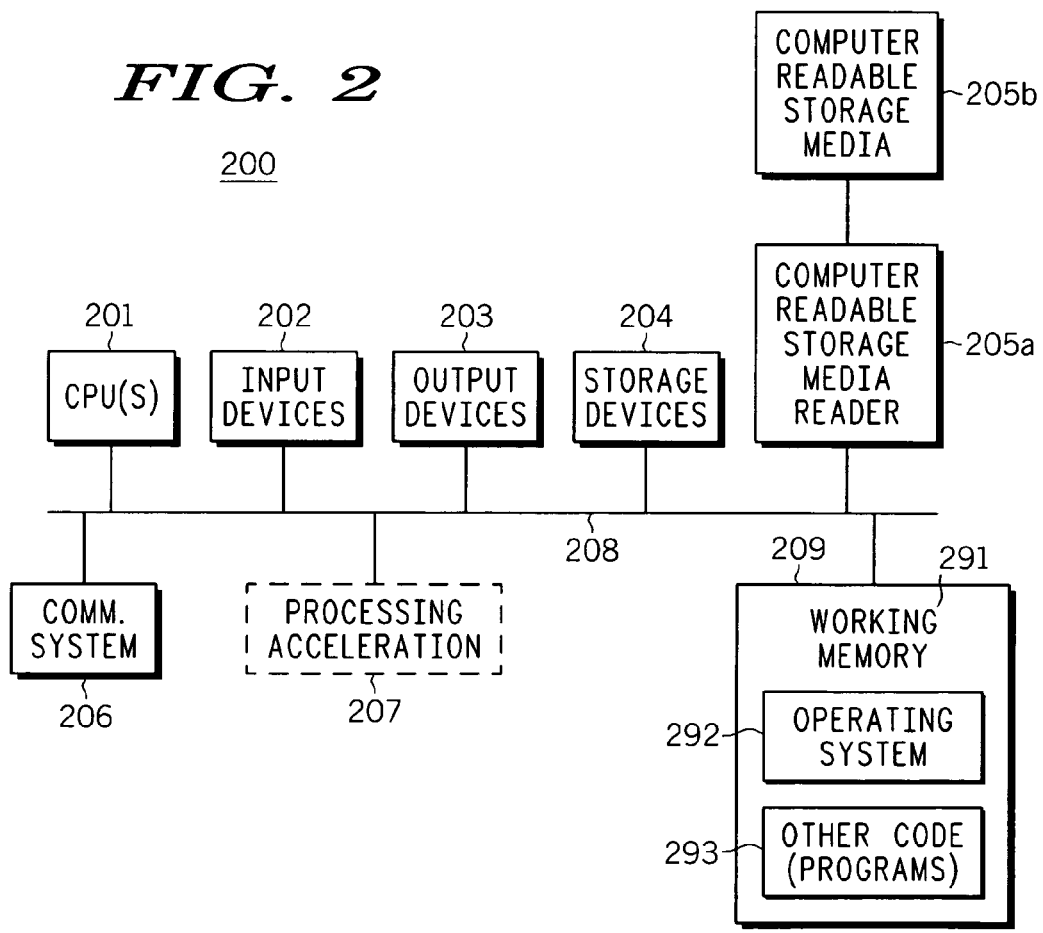
FIG. 2 illustrates a system for implementing a computing device that can be utilized for the devices shown in FIGS. 1 and 4.
Figure 3A:
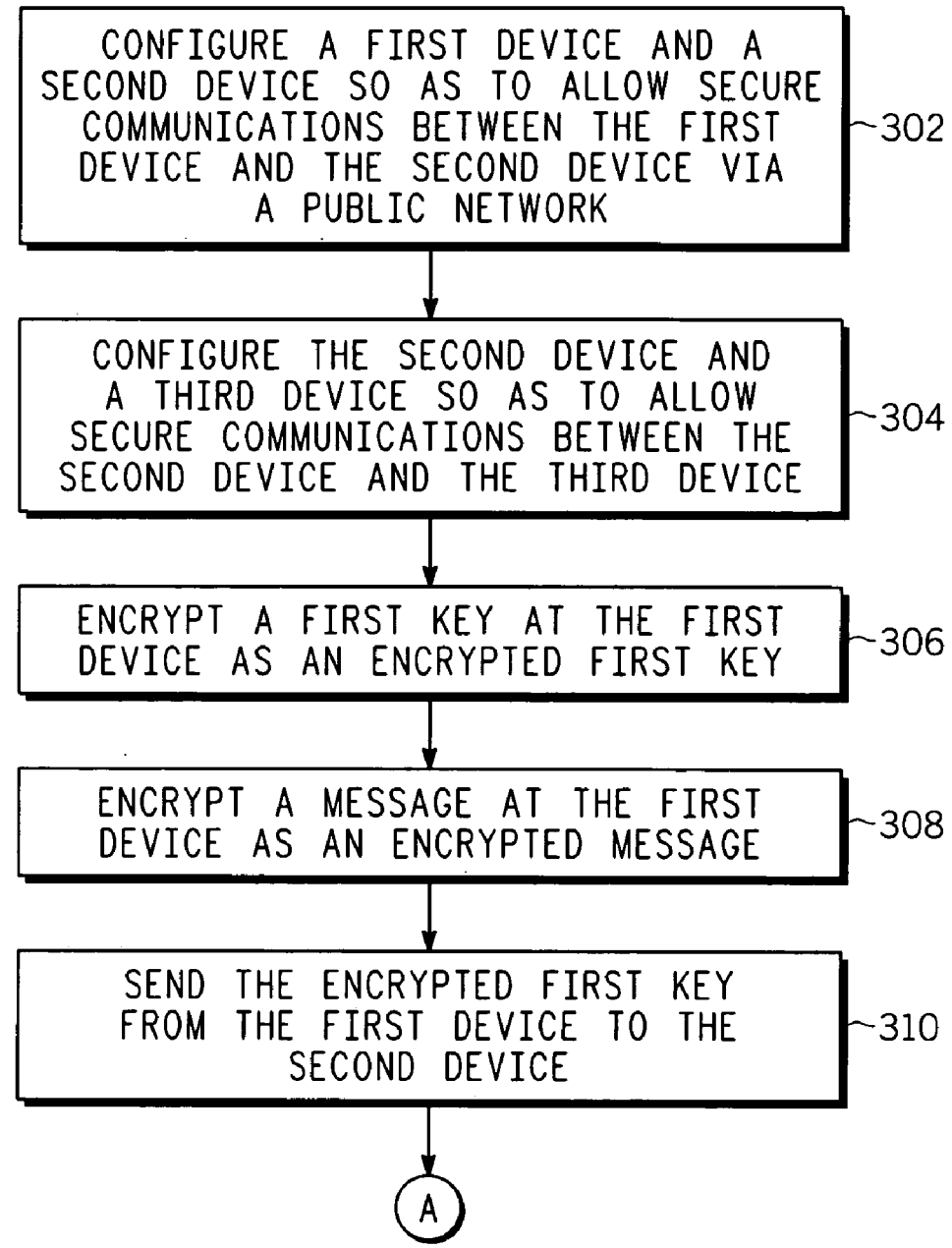
FIGS. 3A, 3B, 3C, 3D, 3E, and 3F illustrate a flow chart demonstrating a method of implementing a cryptographic protocol according to one embodiment of the invention.
Figure 3B:
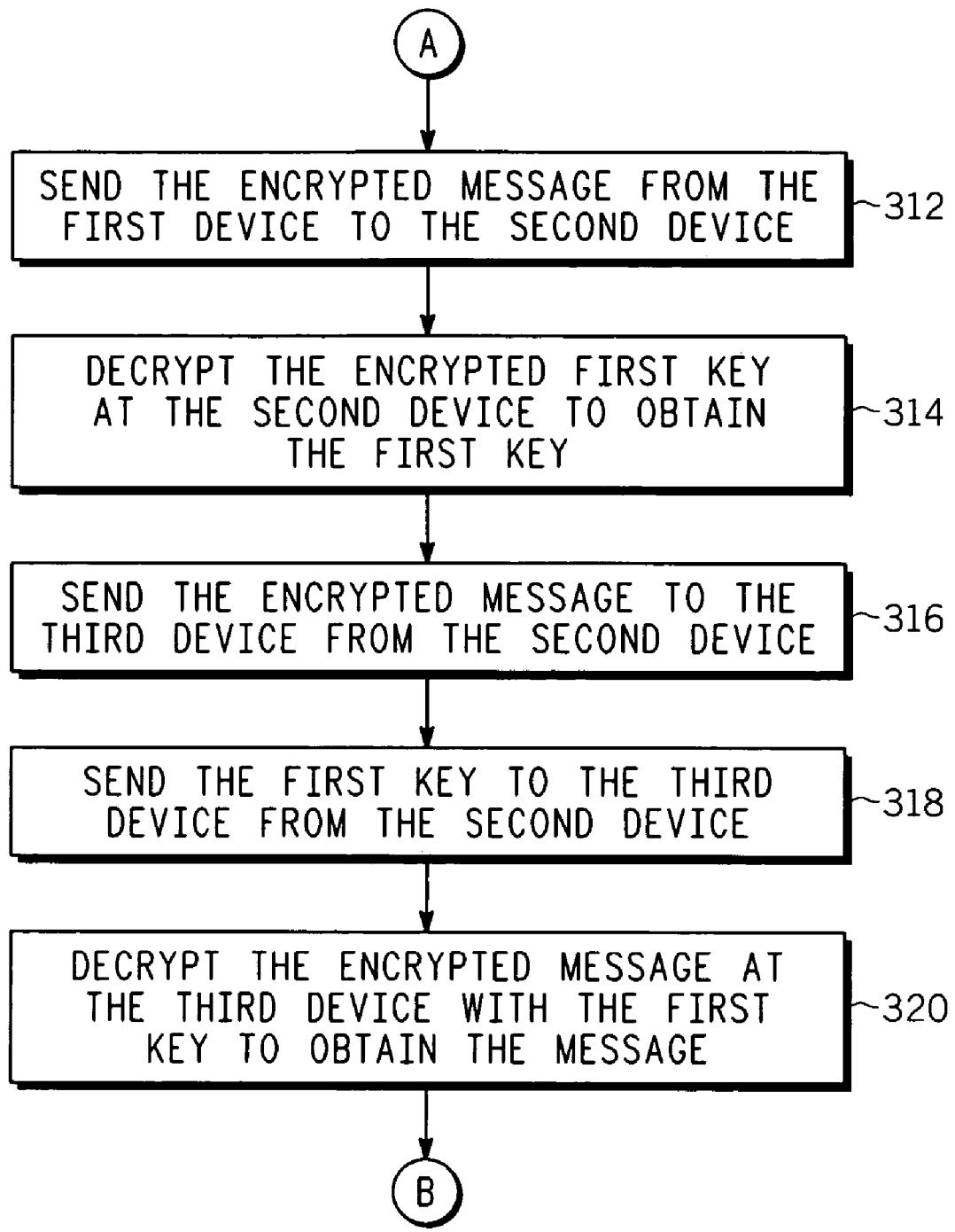
Figure 3C:
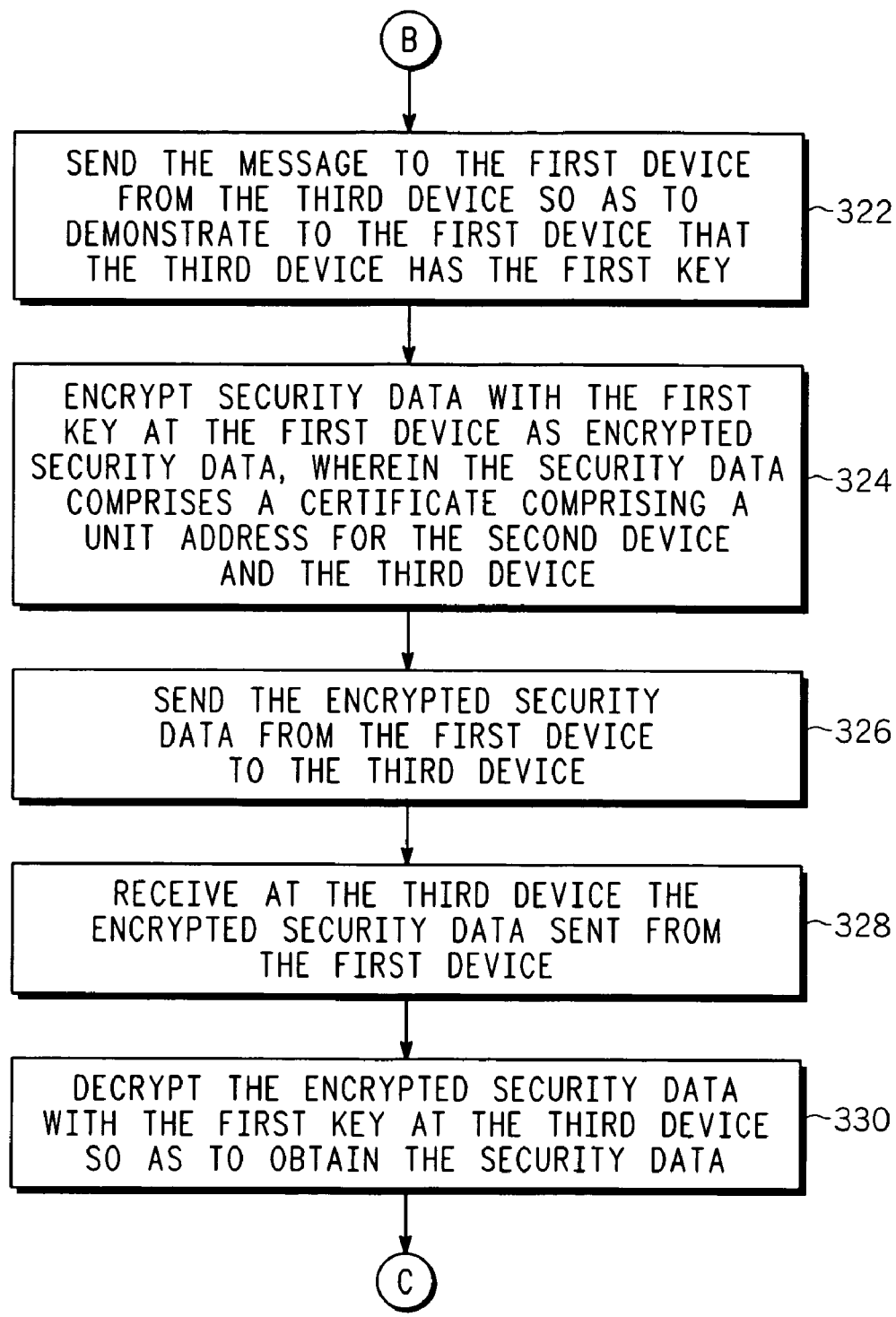
Figure 3D:
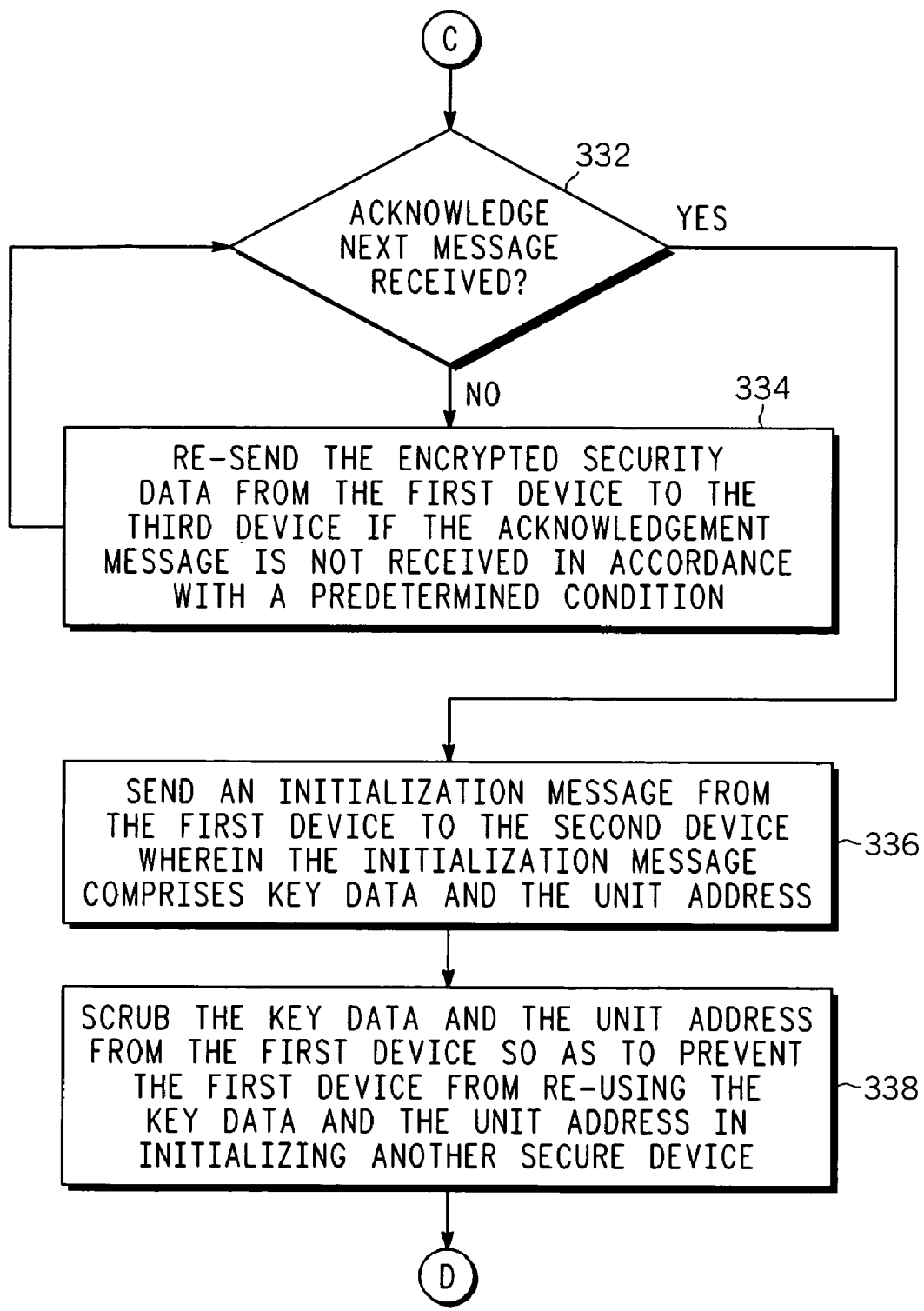
Figure 3E:
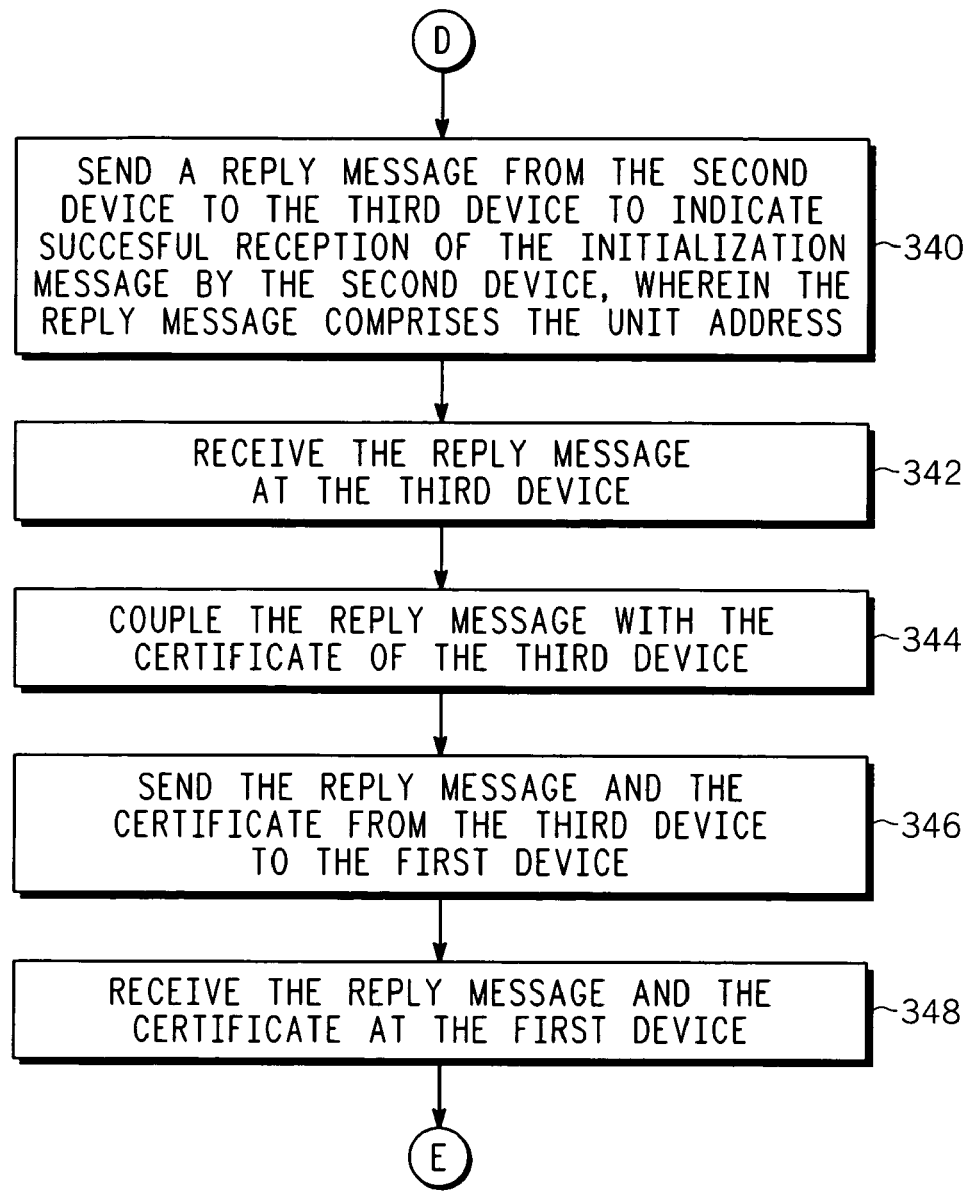
Figure 3F:
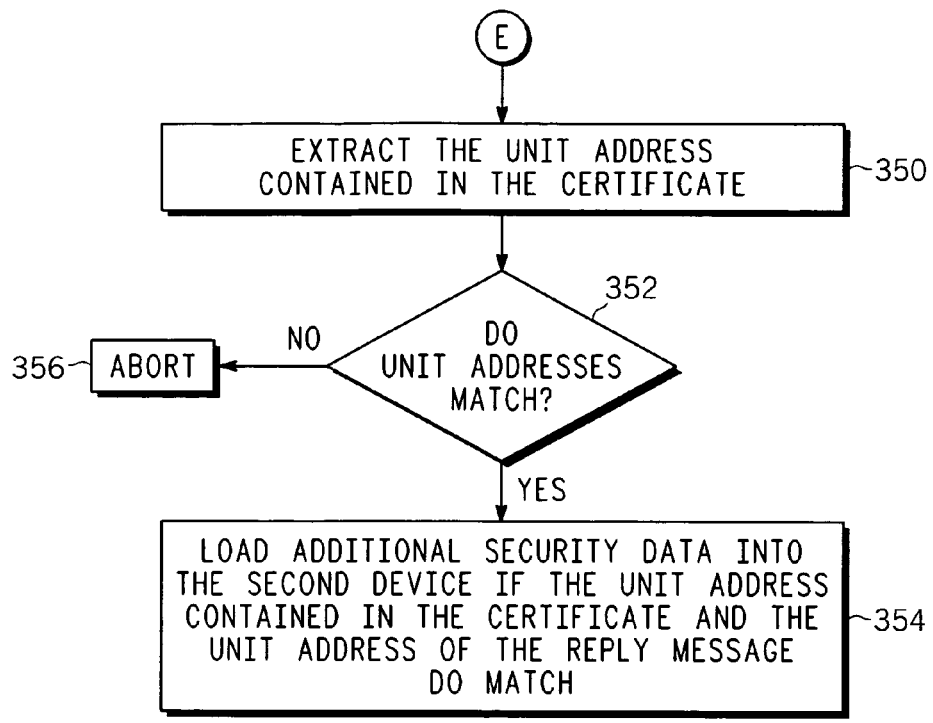

FIG. 2 illustrates a typical computing device. Variations of this device can be utilized to implement the devices shown in FIG. 1. Namely, FIG. 2 broadly illustrates how individual system elements can be implemented. System 200 is shown comprised of hardware elements that are electrically coupled via bus 208, including a processor 201, input device 202, output device 203, storage device 204, computer-readable storage media reader 205a, communications system 206 processing acceleration (e.g., DSP or special-purpose processors) 207 and memory 209. Computer-readable storage media reader 205a is further coupled to computer-readable storage media 205b, the combination comprehensively representing remote, local, fixed and/or removable storage devices plus storage media, memory, etc. for temporarily and/or more permanently containing computer-readable information, which can include storage device 204, memory 209 and/or any other such accessible system 200 resource. System 200 also comprises software elements (shown as being currently located within working memory 291) including an operating system 292 and other code 293, such as programs, applets, data and the like.

System 200 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 200 component (e.g. within communications system 206). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized. Not all system 200 components will necessarily be required in all cases.

Referring now to FIGS. 3A, 3B, 3C, 3D, 3E, and 3F an exemplary flow chart 300 demonstrates a method of implementing a security protocol according to one embodiment of the invention. This method can be implemented between a first trusted device storing security data, a second security device which has a pre-configured security protocol arranged with the first trusted device, and a third device that has a secure link or relationship with the second device. The third device requires data from the first device—but, the third device has no pre-configured secure relationship with the first device. Thus, according to block 302 in flow chart 300, the first device and second device are configured so as to allow secure communications between them. This can be accomplished across any network—even a public network such as the internet. In block 304, the second device and the third device are configured so as to allow secure communications between the second device and the third device. This can be implemented for example by providing a direct communication link between the second device and the third device. In block 306, a first key is encrypted at the first device as an encrypted first key. Furthermore, a message, such as a security message is encrypted at the first device as an encrypted message. This is shown in block 308. The first key is utilized as the encryption key in encrypting the message so as to obtain the encrypted message. In block 310, the encrypted first key is sent from the first device to the second device. Furthermore, in block 312, the encrypted message is sent from the first device to the second device. Preferably, the encrypted first key and the encrypted message are sent together as part of the same message packet transmission.

The second device receives the encrypted first key and the encrypted message. In block 314, the encrypted first key is decrypted, for example at the second device, to obtain the first key. The encrypted message need not be decrypted at the second device. Rather, the encrypted message can be sent to the third device from the second device as shown in block 316. The first key (which was decrypted from the encrypted first key at the second device) is also forwarded from the second device to the third device, as shown in block 318.

The third device receives the encrypted message from the second device. The third device also receives the first key from the second device. This can be implemented as separate transmissions or a joint transmission of the data. In block 320, the third device can then use the first key to decrypt the encrypted message so as to obtain the message that was initially encrypted by the first device. In block 322, the message obtained by the third device is sent to the first device from the third device. When the first device receives this message, it knows that the third device has the first key. The first device can simply compare content of the transmission received from the third device with the message content that the first device encrypted in order to verify that they are the same.

The first device, having established that the third device now has the first key can encrypt data such as additional security or personalization data using the first key. For example, the data may include a certificate that holds the unit address for a set top box of which the second and third devices form a part of. Block 324 illustrates this. In block 326, the encrypted security data is sent to from the first device to the third device. Furthermore, it is received at the third device as illustrated by block 328.

In block 330, the encrypted security data is decrypted with the first key at the third device so as to obtain the security data in its original form. An acknowledgement message can then be sent by the third device to the first device to acknowledge receipt of the data.

Block 332 illustrates that the first device can check for the acknowledgement message so as to confirm that the third device received the security data. If the acknowledgement message is not received within a given parameter, such as within a predetermined period of time, the encrypted security data can be re-sent from the first device to the third device. This is shown in block 334. However, if the acknowledgement message is received the first device can proceed with additional messages.

Once the third device has been provided with the data from the first device, the second device can be provisioned. Block 336 illustrates that an initialization message can be sent from the first device to the second device. The initialization message can be comprised of key data as well as the unit address to be assigned to the second device. This key data is typically very sensitive data and great efforts are taken to preserve its secrecy. Thus, once it is transmitted from the first device for reception by the second device, it will not be resent should the transmission fail. Rather, as shown by block 338, the key data and unit address will be scrubbed from the first device so as to prevent the first device from re-using the data to initialize another secure device, such as another set top box.

Once the second device securely receives the key data from the initialization message, additional provisioning of the second device can be implemented. Therefore, a communication protocol is implemented to notify the first device that the second device received the key data and is still appropriately coupled with the third device. Therefore, in block 340, a reply message is sent from the second device to the third device to indicate successful reception of the initialization message by the second device. The reply message includes the unit address sent to the second device by the first device. For purposes of this security protocol, the unit address can simply be any data value used by the first device. It need not have any additional purpose. However, it is noted that it can conveniently be used as an identifier assigned to a particular device, such as a set top box.

The third device receives the reply message as shown in block 342. The reply message is coupled with the certificate held by the third device, as shown in block 344 and sent from the third device to the first device, as shown in block 346.

The first device receives the reply message/certificate in block 348. Furthermore, the first device can extract the unit address from the certificate in block 350 and compare the extracted unit address from the certificate with the unit address contained in the reply message, as shown in block 352. If the unit address data matches, the first device can continue to load the first device with security data, as shown in block 354. However, if the unit address data does not match, then the process is aborted, as shown in block 356. Similarly, if no message at all is received from the third device to confirm delivery, the process is aborted.

This process can be repeated to load additional security data, such as additional security messages to the second device from the first device. After all data has been loaded, the second device can be altered to prevent unauthorized retrieval of information stored on the second device. For example, in the case of an ASIC, fuses can be blown on the ASIC to prevent external retrieval of the information stored on the ASIC. Thus, the ASIC is free to use the security data internally without fear of the data being obtained by an external device.

The above embodiment illustrates that the method demonstrated in FIGS. 3A, 3B, 3C, 3D, 3E, and 3F can be utilized to conserve security data. As noted above, once the first device sends the highly secretive data to the second device, that key data is scrubbed from the first device to avoid a second distribution of the highly secretive data. Therefore, the distribution of the certificate to the third device from the first device can be implemented prior to the distribution of the highly secretive key data that is distributed to the second device. This allows repeated attempts to send the certificate to the third device. If the second device were loaded with the certificate from the first device after the highly secretive key data was distributed to the second device, a failure in sending the certificate would cause the certificate to be scrubbed and the second device to be discarded. This would be a waste of resources.

Furthermore, the above embodiment illustrates how the security mechanism in place between the first device and the second device can be leveraged to allow a secure transmission to take place between the first device and the third device. This is beneficial in that it allows the third device to be configured without requiring any pre-configured security arrangement between the first device and the third device.

Figure 4:
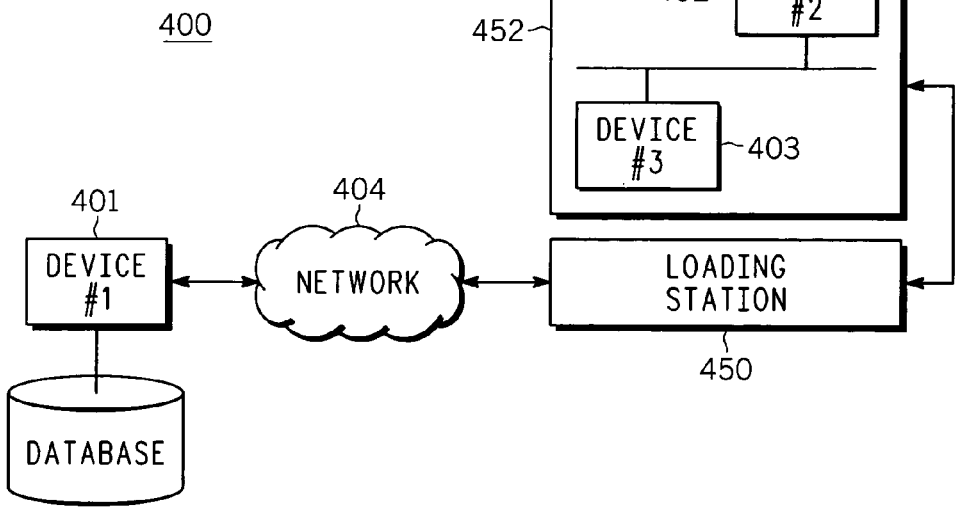
FIG. 4 illustrates a system for loading security data in a cryptographic device suitable for use in the cable operation business, for example, according to one embodiment of the invention.

Referring now to FIG. 4, an embodiment for loading cryptographic information to a set top box can be seen. FIG. 4 shows a system 400 having a computer such as a server/database 401. The server 401 is shown coupled across a network 404 with what will be referred to as a seed loading station 450. Seed loading station 450 serves as a device to assist in loading initial security data into a set top box in order to initialize the set top box. The seed loading station 450 is shown coupled with a set top box 452. Furthermore, the set top box 452 is shown having an application specific integrated circuit 402 coupled with firmware 403. In keeping with the nomenclature utilized for the above described embodiment, the server 401 can be considered the first device, the ASIC 402 can be considered the second device, and the firmware 403 can be considered the third device.

Figure 5A:
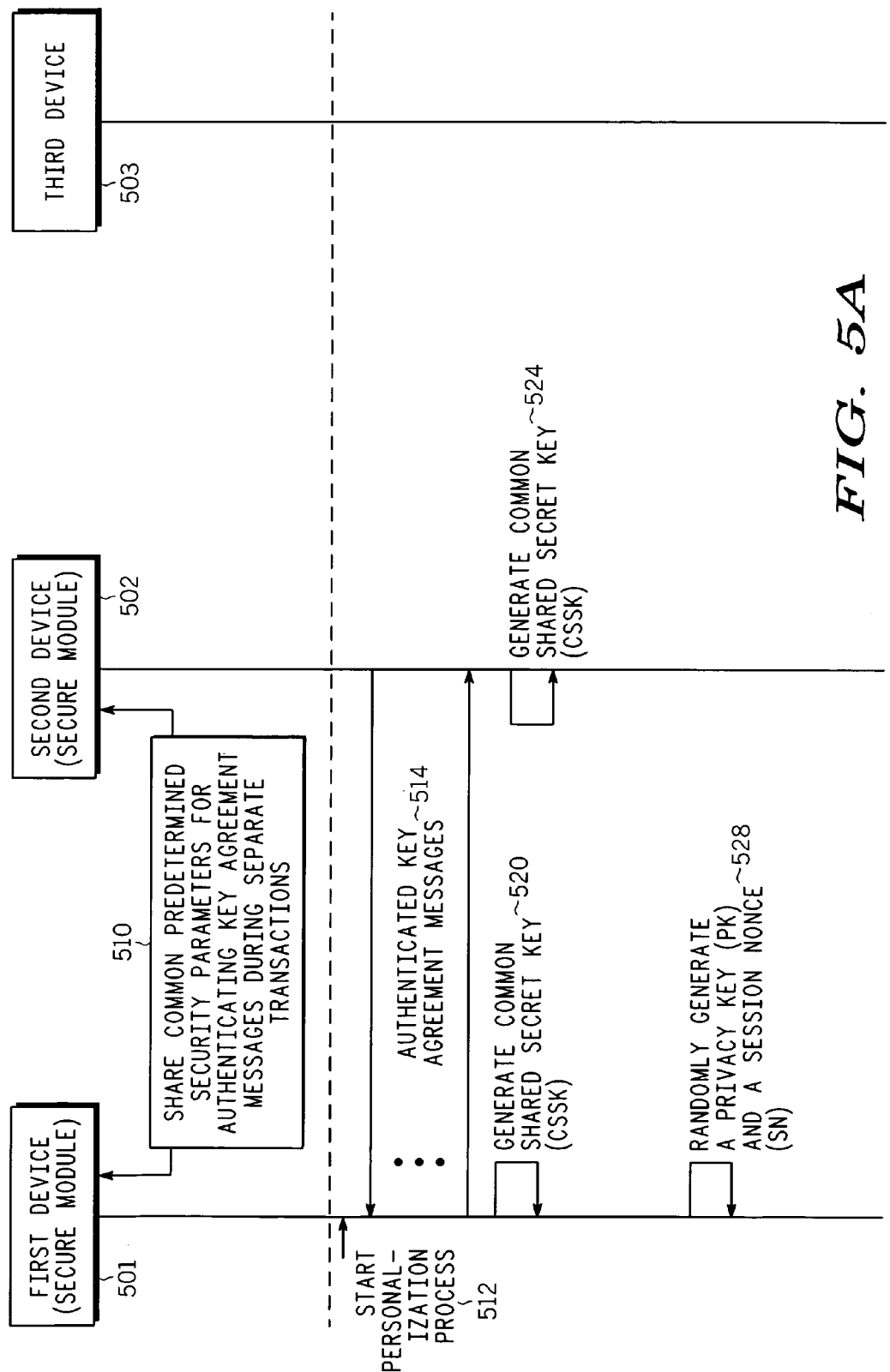
FIGS. 5A, 5B, and 5C illustrate a sequence diagram demonstrating a protocol for loading security data in the system shown in FIG. 4, according to one embodiment of the invention.
Figure 5B:
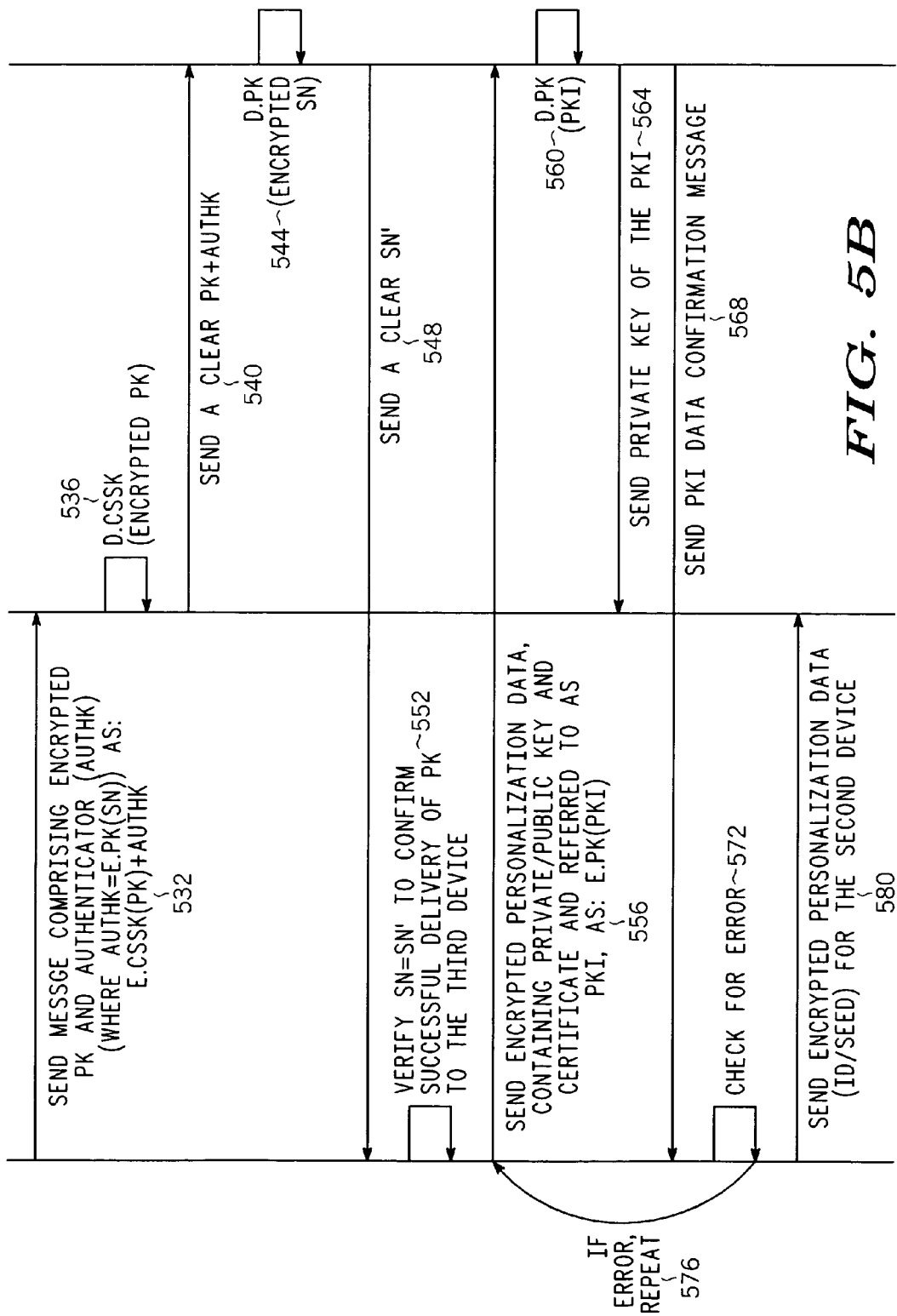
Figure 5C:
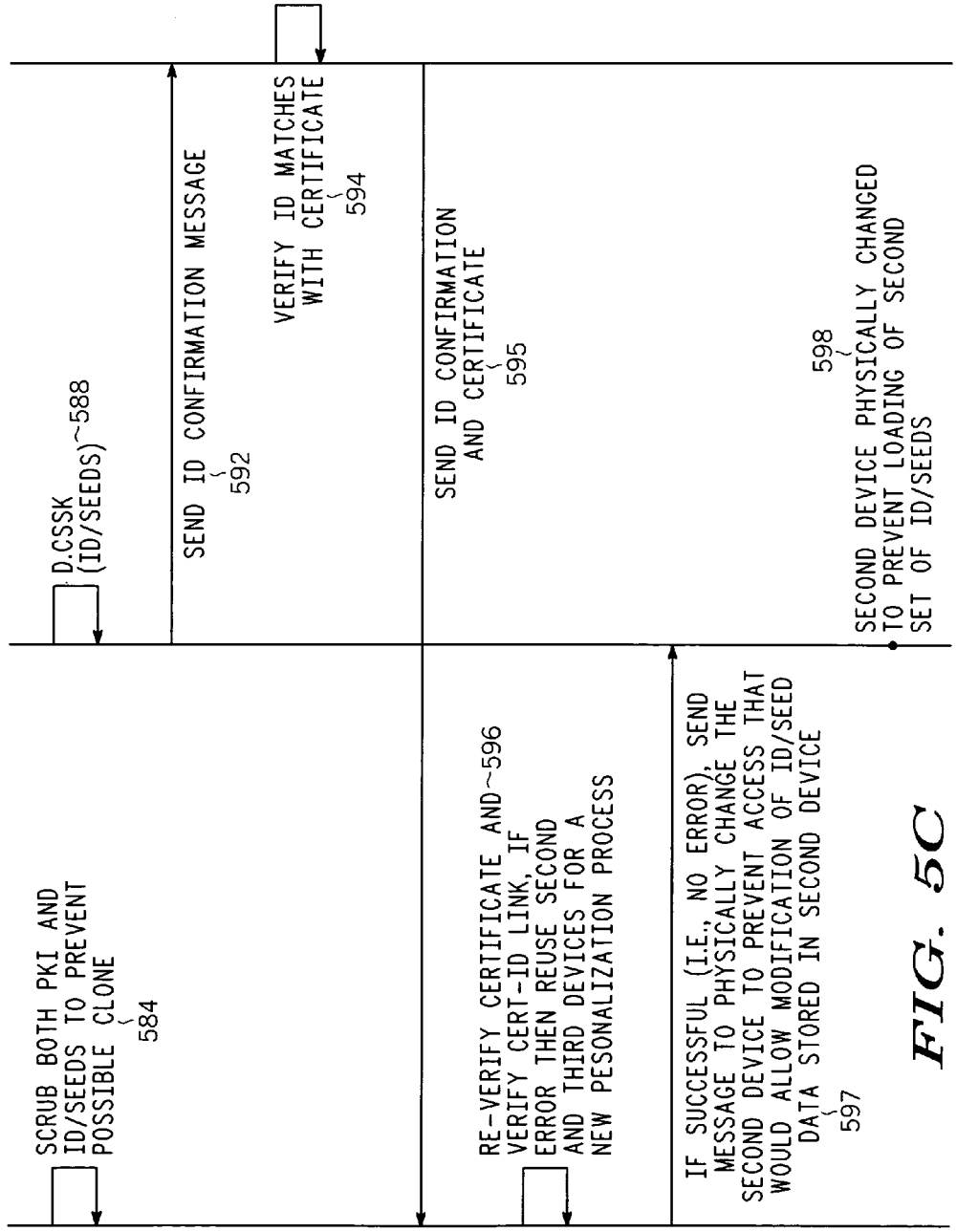

Referring now to FIG. 5A, 5B, and 5C, a sequence diagram is shown that illustrates, for example, the loading of data from the server shown in FIG. 1 into the ASIC 402 and firmware 403, according to one embodiment of the invention. For example, the ASIC and firmware can be part of a set-top box being initialized for deployment at a consumer's home.

In FIG. 5A, a first device 501, second device 502, and a third device 503 are all shown. The first device and second device are predisposed in a secure relationship. As shown in block 510, the first device and second device are provisioned with predetermined security parameters that can be used for authenticating key agreement messages during separate transactions. Furthermore, the first and second devices can be configured to utilize the parameters to perform a predetermined cryptographic routine that allows them to communicate in a secure manner with one another. Furthermore, the parameters can be utilized on a repeat basis for generating new secure messages when necessary—such as at the beginning of the personalization process for each new device being personalized. Or, for each reapeat of the personalization process, if the initial process fails.

FIGS. 5A, 5B, and 5C show a sequence diagram for implementing a personalization process. As shown in block 512, the personalization process can begin. The first device might prompt the initialization or the initialization may be prompted by the second or third devices. Block 514 shows that an authenticated key agreement message exchange can then take place between the first device and the second device. For example, based on the shared security parameters, public and private keys can be generated by the two devices and their public keys then exchanged. This then allows the first device 501 to generate a common shared secret key (CSSK) as shown in block 520 and also allows the second device 502 to generate the same common shared secret key (CSSK) as shown in block 524. For example, this could be accomplished by one of the devices generating a random number and providing it to the other device using Public Key Infrastructure. The receiving device and sending device could then both perform a predetermined algorithm on the random number using the predetermined algorithm that was stored in each device as part of block 510.

Once the first device and second device generate the CSSK, the first device can then randomly generate a privacy key (PK) and a session nonce (SN) as shown in block 528. A nonce is a randomly generated number that cannot duplicate a random number previously generated by the random number generator. Thus, it is a random number that is provided only once to a process.

In block 532, a message is sent from the first device to the second device. The message comprises an encrypted version of the PK that is encrypted using the CSSK. Also, the message comprises the SN encrypted with the PK. This SN encrypted with the PK is referred to as the AUTHK.

In block 536, the encrypted PK is decrypted using the CSSK that was previously generated by the second device.

Furthermore, as shown in block 540, the clear PK and AUTHK are then sent to the third device.

At this point, the third device can then decrypt the AUTHK using the PK. Namely, as shown in block 544, the third device decrypts the encrypted SN using the PK received from the second device.

The third device can then demonstrate its relationship with the trusted second device to the first device by sending the clear SN' to the first device as shown in block 548. The first device compares SN to SN' to verify that they match, which confirms for the first device that there was a successful delivey of PK to the third device, as shown in block 552. This also demonstrates that the third device is in communication with the second device (which itself is in secure communication with the first device) because the third device had to receive the PK from the second device in order to decrypt the encrypted SN. Furthermore, the second device could only provide the PK to the third device by using the CSSK to decrypt the encrypted PK. And, as noted earlier, the CSSK was only available to the second device because of the pre-configured parameters with which the second and first devices were provisioned prior to the process beginning. Thus, since the first and third devices now share the PK which permits secure communications between the first and second devices, the protocol has leveraged the pre-existing security arrangement between the first and second devices to implement secure communications between the first and third devices.

In block 556, the first device sends encrypted personalization data containing private/public key and certificate to the third device. This is referred to as PKI. The PKI is encrypted with the PK.

In block 560, the third device decrypts the encrypted PKI using the PK. Furthermore, in block 564, the third device then sends the clear private key of the PKI to the second device. In addition, the third device sends a PKI data confirmation message to the first device, as shown in block 568.

In block 572, the first device checks for errors. For example, if no data acknowledgement message is received or the data acknowledgement message itself indicates that there was a transmission problem, block 576 triggers a repeat of the sending of the personalization data. This allows the protocol to try multiple times to send a certificate without having to dispose of the certificate after a failed attempt.

Once the third device has received the certificate as part of the clear PKI, the second device can be provisioned with personalization data for the second device. This can be highly secretive data that the second device needs to operate in a cable system, for example. It might include a master key for use by the second device. In block 580, encrypted personalization data for use by the second device, such as ID and seed data, is sent from the first device to the second device. Since the first device does not want this data to be available as cloned data by an attacker, the data (again, the ID and seed data) is scrubbed along with the PKI data, as shown in block 584.

Upon receiving the encrypted personalization data, the second device can decrypt it. Thus, if the ID and seed data had been encrypted using CSSK, the second device could decrypt it using CSSK to obtain the clear ID and seed data, as shown by block 588.

In block 592, the second device then sends an ID confirmation message to the third device. Furthermore, the third device verifies that the ID matches the ID that is stored in the previously delivered certificate. If the ID received at the third device from the second device matches the ID that forms part of the certificate, then the third device sends an ID confirmation message with the certificate to the first device, as shown in block 595.

In block 596, the first device re-verifies the certificate and re-verifies the certificate and ID link. If there is an error, then the personalization process is stopped. (However, the second and third devices are still available for a new personalization process.)

If there is no error, then the personalization process can be completed by physically changing the second device so that it can not be reconfigured and/or can not provide access to an external party to the personalization data for purposes of cloning. Thus, block 597 indicates that a message can be sent from the first device to the second device to prevent access that would allow modification of the ID/seed data stored in the second device. When this message is received at the second device, the second device can physically change to prevent loading of a second set of ID/seed data, as illustrated in block 598.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well. Furthermore, the embodiments of the invention may be embodied as code stored in a computer-readable memory of virtually any kind including, without limitation, RAM, ROM, magnetic media, optical media, or magneto-optical media. Even more generally, the embodiments of the invention could be implemented in software, or in hardware, or any combination thereof including, but not limited to, software running on a general purpose processor, microcode, PLAs, or ASICs.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents, including the matter incorporated by reference.

It is thought that the apparatuses and methods of the embodiments of the present invention and its attendant advantages will be understood from this specification. While the above is a complete description of specific embodiments of the invention, the above description should not be taken as limiting the scope of the invention as defined by the claims.

What is claimed is:

1. A method of distributing security data in a system comprising a first trusted device, a second security device having a pre-established security relationship with said trusted device, and a third device having a secure relationship with said second device and requiring data from said trusted device in order to establish a secure relationship with said trusted device, said method comprising:
   configuring said first device and said second device so as to allow secure communications between said first device and said second device via a network;
   configuring said second device and said third device so as to allow secure communications between said second device and said third device;
   encrypting a first key at said first device as an encrypted first key;
   encrypting a message at said first device as an encrypted message;
   sending said encrypted first key from said first device to said second device;
   sending said encrypted message from said first device to said second device;
   decrypting said encrypted first key at said second device to obtain said first key;
   sending said encrypted message to said third device from said second device;
   sending said first key to said third device from said second device;
   decrypting said encrypted message at said third device with said first key to obtain said message;
   sending said message to said first device from said third device so as to demonstrate to said first device that said third device has said first key;
   encrypting security data with said first key at said first device as encrypted security data;
   sending said encrypted security data from said first device to said third device;
   encrypting security data with said first key at said first device as encrypted security data;
   sending said encrypted security data from said first device to said third device;
   sending an initialization message from said first device to said second device wherein said initialization message comprises a key data and a unit address;
   sending a reply message from said second device to said third device to indicate successful reception of said initialization message by said second device, wherein said reply message comprises said unit address;
   receiving said reply message at said third device;
   coupling said reply message with said certificate of said third device;
   sending said reply message and said certificate from said third device to said first device;
   receiving said reply message and said certificate at said first device;
   extracting said unit address contained in said certificate; and
   determining whether said unit address contained in said certificate and said unit address of said reply message match.

2. The method as claimed in claim 1 and further comprising:
   checking for an acknowledgement message at said first device to confirm that said third device received said encrypted security data.

3. The method as claimed in claim 2 and further comprising:
   re-sending said encrypted security data from said first device to said third device if said acknowledgement message is not received in accordance with a predetermined condition so as to only send an encrypted personalization data message once so as to prevent a cloning of said second device.

4. The method as claimed in claim 1 wherein said security data comprises a certificate comprising a unit address for said second device and said third device.

5. The method as claimed in claim 1 and further comprising:
scrubbing said key data and said unit address from said first device so as to prevent said first device from re-using said key data and said unit address in initializing another secure device.

6. The method as claimed in claim 1 and further comprising:
aborting the loading of data into said second device if said unit address contained in said certificate and said unit address of said reply message do not match.

7. The method as claimed in claim 1 and further comprising:
loading additional security data into said second device if said unit address contained in said certificate and said unit address of said reply message do match.

8. The method as claimed in claim 1 wherein said sending said encrypted first key from said first device to said second device and said sending said encrypted message from said first device to said second device comprises sending said encrypted first key and said encrypted message together from said first device to said second device.

9. The method as claimed in claim 1 wherein said configuring said first device and said second device so as to allow secure communications between said first device and said second device via a public network comprises:
utilizing elliptical curve Diffie Hellman protocol to generate a shared key shared by said first device and said second device.

10. The method as claimed in claim 1 wherein said network between said first device and said second device is a public network.

11. A method of distributing security data in a system comprising a first trusted device, a second security device having a pre-established security relationship with said trusted device, and a third device having a secure relationship with said second device and requiring data from said trusted device in order to establish a secure relationship with said trusted device, said method comprising:
configuring a second device so as to allow secure communications between a first device and said second device via a network;
configuring said second device and a third device so as to allow secure communications between said second device and said third device;
receiving an encrypted first key at said second device from said first device;
receiving an encrypted message from said first device at said second device;
decrypting said encrypted first key at said second device to obtain said first key;
sending said encrypted message to said third device from said second device;
sending said first key to said third device from said second device;
decrypting said encrypted message at said third device with said first key to obtain said message;
sending said message to said first device from said third device so as to demonstrate to said first device that said third device has said first key;
encrypting security data with said first key at said first device as encrypted security data;
receiving from said first device at said third device encrypted security data encrypted with said first key at said first device;
receiving at said third device said encrypted security data sent from said first device;
decrypting said encrypted security data with said first key at said third device so as to obtain said security data;
receiving an initialization message from said first device at said second device wherein said initialization message comprises a key data and a unit address;
sending a reply message from said second device to said third device to indicate successful reception of said initialization message by said second device, wherein said reply message comprises said unit address;
receiving said reply message at said third device;
coupling said reply message with said certificate of said third device; and
sending said reply message and said certificate from said third device to said first device.

12. The method as claimed in claim 11 and further comprising:
sending an acknowledgement message to said first device from said third device to confirm that said third device received said encrypted security data.

13. The method as claimed in claim 11 wherein said security data comprises a certificate comprising a unit address for said second device and said third device.

14. The method as claimed in claim 11 wherein said network between said first device and said second device is a public network.

15. A method of distributing security data in a system comprising a first trusted device, a second security device having a pre-established security relationship with said trusted device, and a third device having a secure relationship with said second device and requiring data from said trusted device in order to establish a secure relationship with said trusted device, said method comprising:
configuring said first device and said second device so as to allow secure communications between said first device and said second device via a public network;
configuring said second device and said third device so as to allow secure communications between said second device and said third device;
encrypting a first key at said first device as an encrypted first key;
encrypting a message at said first device as an encrypted message;
sending said encrypted first key from said first device to said second device;
sending said encrypted message from said first device to said second device;
decrypting said encrypted first key at said second device to obtain said first key;
sending said encrypted message to said third device from said second device;
sending said first key to said third device from said second device;
decrypting said encrypted message at said third device with said first key to obtain said message;
sending said message to said first device from said third device so as to demonstrate to said first device that said third device has said first key;
encrypting security data with said first key at said first device as encrypted security data, wherein said security data comprises a certificate comprising a unit address for said second device and said third device;

sending said encrypted security data from said first device to said third device;

receiving at said third device said encrypted security data sent from said first device;

decrypting said encrypted security data with said first key at said third device so as to obtain said security data;

checking for an acknowledgement message at said first device to confirm that said third device received said encrypted security data;

re-sending said encrypted security data from said first device to said third device if said acknowledgement message is not received in accordance with a predetermined condition;

sending an initialization message from said first device to said second device wherein said initialization message comprises key data and said unit address;

scrubbing said key data and said unit address from said first device so as to prevent said first device from re-using said key data and said unit address in initializing another secure device;

sending a reply message from said second device to said third device to indicate successful reception of said initialization message by said second device, wherein said reply message comprises said unit address;

receiving said reply message at said third device;

coupling said reply message with said certificate of said third device;

sending said reply message and said certificate from said third device to said first device;

receiving said reply message and said certificate at said first device;

extracting said unit address contained in said certificate;

determining whether said unit address contained in said certificate and said unit address of said reply message match; and loading additional security data into said second device if said unit address contained in said certificate and said unit address of said reply message do match.

* * * * *